(12) United States Patent
Benitez et al.

(10) Patent No.: US 9,213,745 B1
(45) Date of Patent: Dec. 15, 2015

(54) METHODS, SYSTEMS, AND MEDIA FOR RANKING CONTENT ITEMS USING TOPICS

(71) Applicants: Ana Benitez, New York, NY (US); Adam Scott Pantel, New York, NY (US); Nitin Khandelwal, Mountain View, CA (US); Jeremy Hylton, Easton, PA (US)

(72) Inventors: Ana Benitez, New York, NY (US); Adam Scott Pantel, New York, NY (US); Nitin Khandelwal, Mountain View, CA (US); Jeremy Hylton, Easton, PA (US)

(73) Assignee: Google Inc., Mountain View, CA (US)

( * ) Notice: Subject to any disclaimer, the term of this patent is extended or adjusted under 35 U.S.C. 154(b) by 240 days.

(21) Appl. No.: 13/844,219

(22) Filed: Mar. 15, 2013

Related U.S. Application Data

(60) Provisional application No. 61/702,689, filed on Sep. 18, 2012.

(51) Int. Cl.
 *G06F 17/30* (2006.01)

(52) U.S. Cl.
 CPC ...... *G06F 17/3053* (2013.01); *G06F 17/30038* (2013.01); *G06F 17/30867* (2013.01); *G06F 17/30997* (2013.01)

(58) Field of Classification Search
 None
 See application file for complete search history.

(56) References Cited

U.S. PATENT DOCUMENTS

| | | | |
|---|---|---|---|
| 7,698,261 B1 * | 4/2010 | Khoshnevisan | 707/999.003 |
| 8,856,099 B1 * | 10/2014 | Lasko et al. | 707/706 |
| 2005/0192955 A1 * | 9/2005 | Farrell | 707/5 |
| 2008/0301095 A1 * | 12/2008 | Zhu et al. | 707/3 |
| 2010/0010982 A1 * | 1/2010 | Broder et al. | 707/5 |
| 2010/0185623 A1 * | 7/2010 | Lu et al. | 707/748 |
| 2011/0029541 A1 * | 2/2011 | Schulman | 707/748 |
| 2011/0125791 A1 * | 5/2011 | Konig et al. | 707/770 |
| 2011/0246456 A1 * | 10/2011 | Weitz et al. | 707/724 |
| 2011/0307482 A1 * | 12/2011 | Radlinski et al. | 707/731 |
| 2013/0080460 A1 * | 3/2013 | Tomko et al. | 707/767 |
| 2013/0173639 A1 * | 7/2013 | Chandra et al. | 707/754 |
| 2013/0179420 A1 * | 7/2013 | Park et al. | 707/706 |

* cited by examiner

*Primary Examiner* — Alex Gofman
*Assistant Examiner* — Umar Mian
(74) *Attorney, Agent, or Firm* — Bryne Poh LLP

(57) ABSTRACT

Methods, systems, and media for ranking content items using topics are provided. In some embodiments, a method for ranking video content is provided, comprising: receiving a search query; generating a plurality of search results in response to the search query; determining one or more entity types associated with a content class within the plurality of search results; determining whether the search query is a query for content belonging to the content class based on a plurality of criterion that includes: (i) determining whether at least one of the plurality of search results is associated with the one or more determined entity types and (ii) determining whether entities shared between the plurality of search results include the one or more determined entity types; and in response to determining that the plurality of criterion have been met, promoting at least one search result of the plurality of search results belonging to the content class.

26 Claims, 5 Drawing Sheets

METHODS, SYSTEMS, AND MEDIA FOR RANKING CONTENT ITEMS USING TOPICS

CROSS REFERENCE TO RELATED APPLICATIONS

This application claims the benefit of U.S. Provisional Patent Application No. 61/702,689, filed Sep. 18, 2012, which is hereby incorporated by reference herein in its entirety.

TECHNICAL FIELD

Methods, systems, and media for ranking content items using topics are provided. More particularly, the disclosed subject matter can include using topics to promote a particular class of content items, such as movie content items.

BACKGROUND

Content providers generally attempt to present content that is of interest to its users. Some content providers promote a particular class of content items to its users. For example, content providers can display or promote a particular class of content items in response to receiving a particular search query.

For example, in response to receiving a search query for a movie and determining that the highest ranked movie result in the search results is the movie that the query seeks, a content provider can classify the movie as an authoritative result for the search query. Such video content items that are deemed authoritative results are typically placed at the top position of the search results displayed in response to the search query. However, there are many instances in which irrelevant or misleading video content items are promoted to the top position of the search results displayed in response to the search query. For example, a knockoff or imitation movie having a name that matches the search query can be triggered and placed at the top position of the search results. In another example, an irrelevant movie having a name that matches at least a portion of search query can also be triggered and placed at the top position of the search results.

SUMMARY

In accordance with some embodiments of the disclosed subject matter, a method for ranking content is provided, the method comprising: receiving, using a hardware processor, a search query; generating a plurality of search results in response to the search query; determining one or more entity types associated with a content class within the plurality of search results; determining whether the search query is a query for content belonging to the content class based on a plurality of criterion that includes: (i) determining whether at least one of the plurality of search results is associated with the one or more determined entity types and (ii) determining whether entities shared between the plurality of search results include the one or more determined entity types; and in response to determining that the plurality of criterion have been met, promoting at least one search result of the plurality of search results belonging to the content class.

In some embodiments, the plurality of search results correspond to at least one of: a video content item, an audio content item, a movie content item, a channel, a playlist, a television show, a topic, a document, a live performance, and a class lecture.

In some embodiments, at least one search result from the plurality of search results is associated with a plurality of entities, and each of the plurality of entities is associated with one of a plurality of entity types.

In some embodiments, the method further comprises determining whether at least one of the plurality of search results is associated with the one or more entity types by accessing a histogram of entities associated with the plurality of search results.

In some embodiments, the method further comprises determining whether the entities shared between the plurality of search results include the one or more entity types by: comparing entity types corresponding to the entities associated with each of the plurality of search results to produce a set of entity types common to the plurality of search results; and determining whether the one or more entity types are included in the set of entity types common to the plurality of search results.

In some embodiments, the plurality of criterion includes determining whether the plurality of search results includes one or more authoritative result candidates having an entity with an entity type corresponding to the one or more entity types. In some embodiments, the method further comprises promoting the one or more authoritative result candidates belonging to the content class within a list of at least a portion of the plurality of search results in response to determining that the plurality of criterion have been met.

In some embodiments, the method further comprises, in response to determining that the plurality of criterion have not been met, performing at least one of: inhibiting the one or more authoritative result candidates from being included in the list of the plurality of search results; inhibiting the one or more authoritative result candidates from being promoted within the list of the plurality of search results; and demoting the one or more authoritative result candidates within a list of at least a portion of the plurality of search results.

In some embodiments, the method further comprises, in response to determining that the plurality of criterion have not been met, performing at least one of: inhibiting the at least one search result of the plurality of search results belonging to the content class from being included in the list of the plurality of search results; inhibiting the at least one search result of the plurality of search results belonging to the content class from being promoted within the list of the plurality of search results; and demoting the at least one search result of the plurality of search results within a list of at least a portion of the plurality of search results.

In accordance with some embodiments of the disclosed subject matter, a method for ranking video content is provided, the method comprising: receiving a search query for a video content item; generating a plurality of search results in response to the search query, wherein the plurality of search results include a plurality of video content items and one or more movie content items; determining whether the search query is a movie query based on one or more criterion, wherein the one or more criterion include (i) determining whether at least one of the plurality of video content items is associated with one or more movie entity types; (ii) determining whether entities shared between the plurality of video content items have entity types that include the one or more movie entity types; and (iii) determining whether the movie content item has an entity of one or more movie entity types; and, in response to determining that a plurality of the one or more criterion have not been met, inhibiting the one or more movie content items from being promoted in a list of the plurality of search results.

In accordance with some embodiments of the disclosed subject matter, a system for ranking content is provided. The system comprises a hardware processor that: receives a search query; generates a plurality of search results in response to the search query; determines one or more entity types associated with a content class within the plurality of search results; determines whether the search query is a query for content belonging to the content class based on a plurality of criterion that includes: (i) determining whether at least one of the plurality of search results is associated with the one or more determined entity types and (ii) determining whether entities shared between the plurality of search results include the one or more determined entity types; and in response to determining that the plurality of criterion have been met, promotes at least one search result of the plurality of search results belonging to the content class.

In accordance with some embodiments of the disclosed subject matter, a system for ranking video content is provided, the system comprising a hardware processor that: receives a search query for a video content item; generates a plurality of search results in response to the search query, wherein the plurality of search results include a plurality of video content items and one or more movie content items; determines whether the search query is a movie query based on one or more criterion, wherein the one or more criterion include (i) determining whether at least one of the plurality of video content items is associated with one or more movie entity types; (ii) determining whether entities shared between the plurality of video content items have entity types that include the one or more movie entity types; and (iii) determining whether the movie content item has an entity of one or more movie entity types; and, in response to determining that a plurality of the one or more criterion have not been met, inhibits the one or more movie content items from being promoted in a list of the plurality of search results.

In accordance with some embodiments of the disclosed subject matter, a non-transitory computer-readable medium containing computer-executable instructions that, when executed by a processor, cause the process to perform a method for ranking content, is provided. The method comprises: receiving a search query; generating a plurality of search results in response to the search query; determining one or more entity types associated with a content class within the plurality of search results; determining whether the search query is a query for content belonging to the content class based on a plurality of criterion that includes: (i) determining whether at least one of the plurality of search results is associated with the one or more determined entity types and (ii) determining whether entities shared between the plurality of search results include the one or more determined entity types; and in response to determining that the plurality of criterion have been met, promoting at least one search result of the plurality of search results belonging to the content class.

In accordance with some embodiments of the disclosed subject matter, a non-transitory computer-readable medium containing computer-executable instructions that, when executed by a processor, cause the process to perform a method for ranking video content, is provided. The method comprises: receiving a search query for a video content item; generating a plurality of search results in response to the search query, wherein the plurality of search results include a plurality of video content items and one or more movie content items; determining whether the search query is a movie query based on one or more criterion, wherein the one or more criterion include (i) determining whether at least one of the plurality of video content items is associated with one or more movie entity types; (ii) determining whether entities shared between the plurality of video content items have entity types that include the one or more movie entity types; and (iii) determining whether the movie content item has an entity of one or more movie entity types; and, in response to determining that a plurality of the one or more criterion have not been met, inhibiting the one or more movie content items from being promoted in a list of the plurality of search results.

In accordance with some embodiments of the disclosed subject matter, a system for ranking content is provided, the system comprising: means for receiving a search query; means for generating a plurality of search results in response to the search query; means for determining one or more entity types associated with a content class within the plurality of search results; means for determining whether the search query is a query for content belonging to the content class based on a plurality of criterion that includes: (i) determining whether at least one of the plurality of search results is associated with the one or more determined entity types and (ii) determining whether entities shared between the plurality of search results include the one or more determined entity types; and in response to determining that the plurality of criterion have been met, means for promoting at least one search result of the plurality of search results belonging to the content class.

In some embodiments, the system further comprises means for determining whether at least one of the plurality of search results is associated with the one or more entity types by accessing a histogram of entities associated with the plurality of search results.

In some embodiments, the system further comprises: means for comparing entity types corresponding to the entities associated with each of the plurality of search results to produce a set of entity types common to the plurality of search results; and means for determining whether the one or more entity types are included in the set of entity types common to the plurality of search results.

In some embodiments, the system further comprises means for determining whether the plurality of search results includes one or more authoritative result candidates having an entity with an entity type corresponding to the one or more entity types. In some embodiments, the method further comprises means for promoting the one or more authoritative result candidates belonging to the content class within a list of at least a portion of the plurality of search results in response to determining that the plurality of criterion have been met.

In some embodiments, the system further comprises, in response to determining that the plurality of criterion have not been met, means for performing at least one of: inhibiting the one or more authoritative result candidates from being included in the list of the plurality of search results; inhibiting the one or more authoritative result candidates from being promoted within the list of the plurality of search results; and demoting the one or more authoritative result candidates within a list of at least a portion of the plurality of search results.

In some embodiments, the system further comprises, in response to determining that the plurality of criterion have not been met, means for performing at least one of: inhibiting the at least one search result of the plurality of search results belonging to the content class from being included in the list of the plurality of search results; inhibiting the at least one search result of the plurality of search results belonging to the content class from being promoted within the list of the plurality of search results; and demoting the at least one search result of the plurality of search results within a list of at least a portion of the plurality of search results.

In accordance with some embodiments of the disclosed subject matter, a system for ranking video content is provided, the system comprising: means for receiving a search query for a video content item; means for generating a plurality of search results in response to the search query, wherein the plurality of search results include a plurality of video content items and one or more movie content items; means for determining whether the search query is a movie query based on one or more criterion, wherein the one or more criterion include (i) determining whether at least one of the plurality of video content items is associated with one or more movie entity types; (ii) determining whether entities shared between the plurality of video content items have entity types that include the one or more movie entity types; and (iii) determining whether the movie content item has an entity of one or more movie entity types; and means for inhibiting the one or more movie content items from being promoted in a list of the plurality of search results in response to determining that a plurality of the one or more criterion have not been met.

In accordance with some embodiments of the disclosed subject matter, a method for ranking content is provided, the method comprising: receiving, using a hardware processor, a search query; generating a plurality of search results in response to the search query; determining one or more entity types associated with a content class within the plurality of search results; determining whether the search query is a query for content belonging to the content class by determining whether at least one of the plurality of search results is associated with the one or more determined entity types; and in response to determining that at least one of the plurality of search results is associated with the one or more determined entity types, promoting the at least one search result of the plurality of search results belonging to the content class.

In accordance with some embodiments of the disclosed subject matter, a method for ranking content is provided, the method comprising: receiving, using a hardware processor, a search query; generating a plurality of search results in response to the search query: determining one or more entity types associated with a content class within the plurality of search results; determining whether the search query is a query for content belonging to the content class by determining whether entities shared between the plurality of search results include the one or more determined entity types; and in response to determining that the entities shared between the plurality of search results include the one or more determined entity types, promoting at least one search result of the plurality of search results belonging to the content class.

BRIEF DESCRIPTION OF THE DRAWINGS

Various objects, features, and advantages of the present invention can be more fully appreciated with reference to the following detailed description of the invention when considered in connection with the following drawing, in which like reference numerals identify like elements.

DETAILED DESCRIPTION

Figure 1:
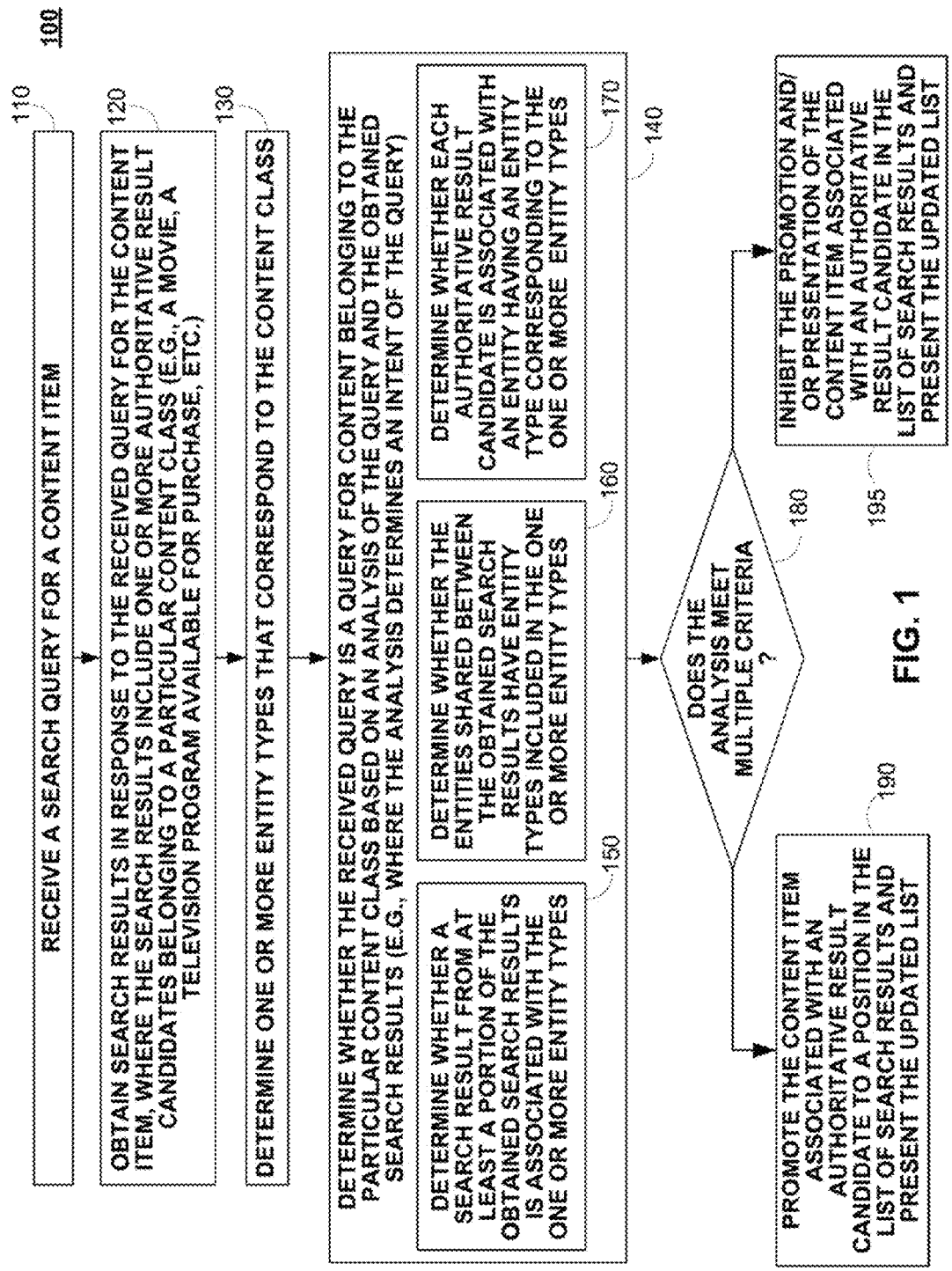
FIG. 1 is a flowchart of an illustrative process for ranking content items based on entities in accordance with some embodiments of the disclosed subject matter.

Generally speaking, the disclosed subject matter relates to ranking content items using topics.

In some embodiments, mechanisms are provided for ranking content items based on topics associated with the content items. For example, the mechanisms can access one or more video databases, where each video content item stored in the database may have metadata, attributes, or entities associated with it. These are sometimes referred to herein as entities. Entities associated with a content item can include any suitable topics or entities associated with a content item, such as a topic, an artist, significant concepts in a video content item, movie information in a video content item, a user-assigned tag, a Freebase entity, a characteristic, a feature, etc. Such entities can be generated and assigned to a video content item using an automatic classification process. It should be noted that some video content items, such as a user-generated content item, may not have associated topics or other suitable entities, while other video content items, such as movie content items, may have associated topics or other suitable entities. It should also be noted that content items, such as user-generated content items, can be transmitted to a suitable classifier such that one or more entities can be assigned.

Each entity can have one or more entity types that indicate the kind of entity or topic that the entity represents. For example, movie entities representing movies, such as the movie having the title "Cars" or the movie having the title "Finding Nemo," can include entities of the entity type MOVIE or the entity type FILM_MOVIE. It should be noted that each entity can have multiple entity types (e.g., Alfred Hitchcock can have a FILM_ACTOR entity type, a FILM_DIRECTOR entity type, and a MUSIC_ARTIST entity type). It should also be noted that a content item can have multiple associated entities.

In some embodiments, these mechanisms can analyze the one or more entity types associated with a video content item to rank video content items. More particularly, in response to receiving a search query, the mechanisms can analyze the one or more entity types associated with the multiple video content items in the search results to determine the likely intent of the search query. Based on the determined intent of the search query, the mechanisms can promote or present and/or inhibit the promotion or presentation of a particular class of content item, such as movie content items. For example, based on the determined intent of the search query, one or more movie content items can be promoted. In another example, based on the determined intent of the search query, one or more search results (e.g., not necessarily authoritative result candidates) can be demoted in the list of search results. In yet another example, based on the determined intent of the search query, one or more authoritative result candidates can be promoted concurrently based on entity information, entity type information, and/or entity scores.

It should be noted that, although the embodiments described herein generally relate to the promotion or presentation (or inhibiting the promotion or presentation) of one or more video content items, one or more movie content items, one or more movie results, or one or more authoritative result candidates, this is merely illustrative. The mechanisms described herein can be applied to any suitable class of content item. For example, the mechanisms can be used to analyze the one or more entity types associated with the content in multiple search results to determine the likely intent of the search query and, in response, promote or present (or inhibit the promotion or presentation of) one or more content items within a particular class (e.g., a premium television content item, a class lecture, a live performance of an artist, etc.). In another example, the mechanisms can, in response to determining a particular intent of the search query using entities or topics, promote or present (or inhibit the promotion or presentation of) multiple classes of content items (e.g., premium television content items and over-the-top content items). In yet another example, the mechanisms can, in response to receiving one or more authoritative result candidates in the search results, determine a content class associated with the one or more authoritative result candidates, determine one or more entity types associated with the content class, and/or analyze the one or more entity types associated with the multiple search results to determine whether to promote or present (or inhibit the promotion or presentation of) the one or more authoritative result candidates.

These mechanisms can be used in a variety of applications. For example, these mechanisms can be used in video search engines to rank video content items based on the likely intent of the search query. In a more particular example, these mechanisms can be implemented on a content hosting service, where the video search engine can promote or present (or inhibit the promotion or presentation of) one or more movie content items in response to a search query for content items provided by the content hosting service. In another example, these mechanisms can be used in other suitable search engines to promote or present (or inhibit the promotion or presentation) of one or more movie content items. In yet another example, these mechanisms can be used to promote or present (or inhibit the promotion of presentation of) any suitable class of content items.

FIG. 1 is a flow chart of an illustrative process 100 for analyzing entity types and other content information in response to a search query in accordance with some embodiments of the disclosed subject matter.

Figure 2:
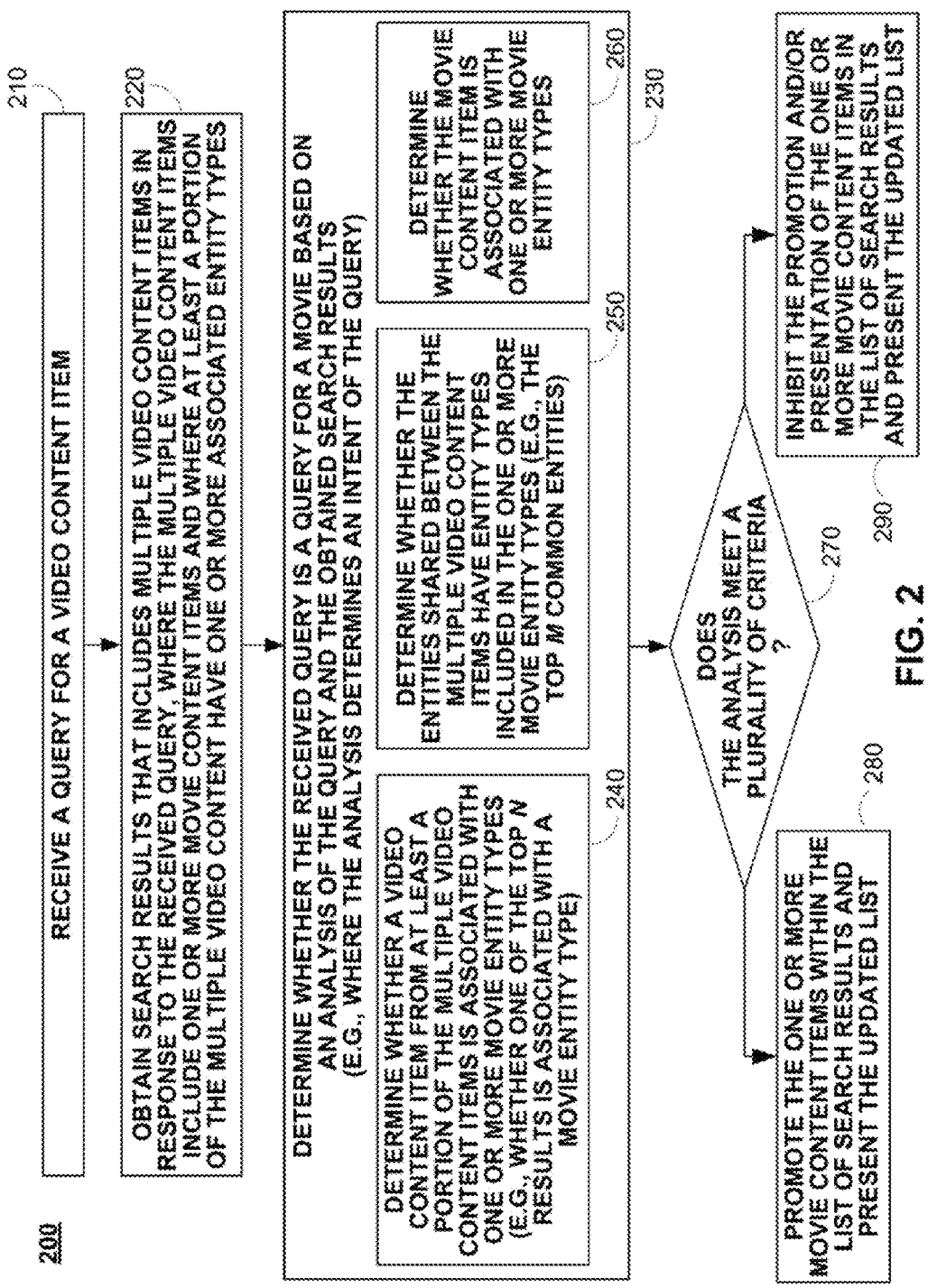
FIG. 2 is a flowchart of an illustrative process for ranking video content items, such as movies, based on entities in accordance with some embodiments of the disclosed subject matter.
Figure 3:
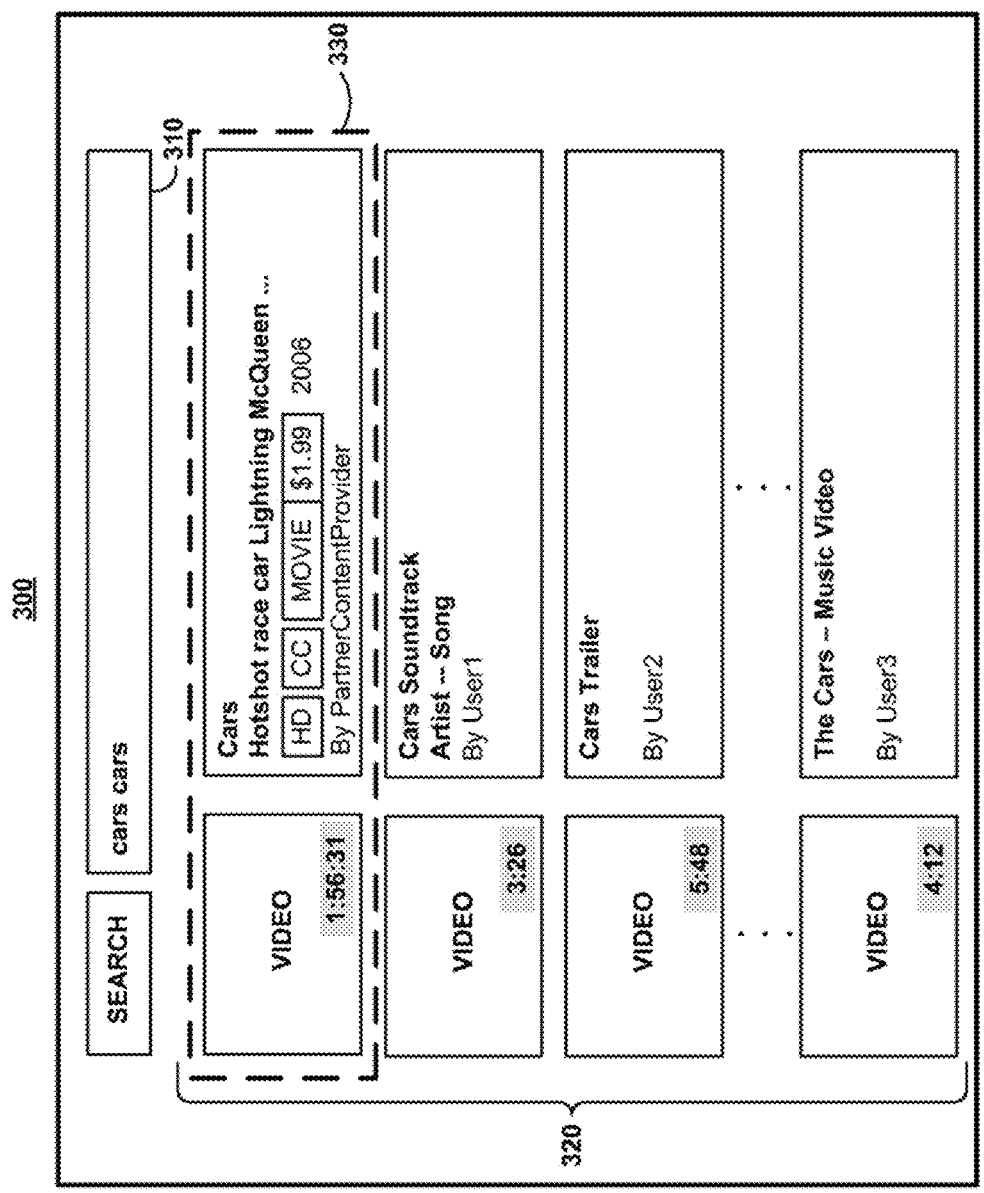
FIG. 3 is an illustrative screen of a list of search results displayed in response to a search query, where a movie content item has been promoted to the top of the list of search results, in accordance with some embodiments of the disclosed subject matter.

Process 100 can begin by receiving a search query for a content item at 110. For example, as shown in FIG. 2, the search query can be a query for a particular video content item, such as a movie. In a more particular example, as shown in FIG. 3, a content hosting service can cause a video search engine page 300 to be displayed on a user device, where the video search engine page 300 includes a search interface 310 for inputting search terms. In particular, FIG. 3 shows that the user has inputted the search terms "cars cars" into search interface 310.

In response to receiving the search query, process 100 can obtain search results and content information associated with the obtained search results at 120. The search results can correspond to any suitable content, such as music content (e.g., live performances), audio content (e.g., class lectures), video content (e.g., movies, video clips, etc.), images, print content, articles, blogs, etc. In particular, referring back to FIGS. 2 and 3, the obtained search results can include search results for multiple video content items and, in some cases, one or more search results for movie content items. The movie content item can be, for example, a full length movie content item. Additionally or alternatively, the obtained search results can also include one or more channels, one or more playlists, one or more topics, etc. It should be noted that the obtained search results can include the top fifty search results, the top hundred search results, all of the search results responsive to the search query, or any other suitable number of search results. It should also be noted that some of the video content items in the search results, such as a user-generated video content item, may not have associated topics or other suitable entities, while other video content items, such as movie content items or authoritative content items, may have associated topics or other suitable entities.

In some embodiments, in response to determining that a content item within the search results does not have associated topics or entities, the content item (or any suitable component of the content item) can be transmitted to a classifier (e.g., an automatic content classifier) that analyzes the content of the content item and assigns one or more entities having particular entity types to the content item. Additionally or alternatively, an indicator corresponding to that content item can be transmitted to a classifier or any other suitable component to indicate that the particular content item requires classification to associate particular entities.

Referring back to FIG. 1, in some embodiments, one or more entity types that correspond to the particular content class can be determined at 130. For example, upon determining that a particular class of content items—e.g., movie content items—should be promoted, but the particular class of content items may be challenging to rank within the content items, a corresponding entity type, such as the MOVIE entity type, can be determined for content items in the particular class. In another example, multiple entity types can be selected that correspond to the particular content class—e.g., a MOVIE entity type for a movie, a MOVIE_ACTOR entity type for an actor in a movie, and a MOVIE_DIRECTOR entity type for a director of a movie. Each of these entity types can indicate that the content item having entities of one or more of these entity types is a movie content item.

In determining whether to promote the one of the search results (e.g., one or more authoritative result candidates) corresponding to a content item (e.g., a full length movie content item, an authoritative movie item, etc.) within the search results, an analysis of the search query and the obtained search results can be performed at 140. This analysis can, for example, determine whether the received search query is a query for a movie or any other suitable class of content item (e.g., a class lecture, a live performance of an artist, etc.). That is, this analysis can determine the likely intent of the received search query—e.g., whether the user that inputted the search query is searching for a movie and whether one or more movie content items in the search results is a suitable match for the search query.

The analysis performed at 140 can include checking for one or more criterion. It should be noted that any suitable criterion using entities, topics, or any other suitable attribute can be used to analyze the search query and the search results responsive to the search query. In a more particular embodiment, an intent score can be generated based on the one or more criterion and, in response to the intent score exceeding an intent threshold, a particular action associated with an authoritative result candidate or any other search result can be performed (e.g., promoting the one or more authoritative result candidates within the list of search results).

In some embodiments, one criterion can include determining whether a search result of the search results is associated with the one or more entity types at 150. For example, as shown at 240 in FIG. 2, a video content server can determine whether a video content item within the search results includes an entity that is associated with one or more movie entity types, such as a FILM_MOVIE entity type, a MOVIE entity type, a MOVIE_ACTOR entity type, a MOVIE_DIRECTOR entity type, etc. In another example, a video content server can determine whether a content item within the search results includes an entity having a particular entity type associated with the class of an authoritative result candidate. In yet another example, a video content server can receive multiple entity types that are associated with a content class for promoting or presenting within the search results and, upon accessing an entity histogram associated with one or more search results, the video content server can determine whether a content item includes an entity having one of the multiple entity types.

In some embodiments, the video content server can determine whether a video content item within a particular number of search results (e.g., the top N search results for the received search query) is associated with one or more entity types. For example, the video content server can compile a list of entity types that appear within a particular number of search results and can determine whether the one or more entity types (e.g., a MOVIE entity type, a MOVIE_DIRECTOR entity type, etc.) are included in the compiled list. Additionally, in some embodiments, the video content server can provide a user with an opportunity to set the number of search results for determining the likely intent of the search query prior to promoting a particular class of content item. For example, a user can indicate to the video content server that the determination is based on the entities, entity types, and other information associated with the top ten video search results.

It should be noted that, upon determining that a video content item within the obtained search results (or N number of search results) is not associated with an entity having one or more movie entity types (e.g., an entity type of the MOVIE entity type or the MOVIE_ACTOR entity type), such a determination can indicate to the video content server that the search query may not intend to search for a movie.

Referring back to FIG. 1, in some embodiments, another criterion can include determining, from the entities shared between the content items returned as search results, whether the shared entities have an associated entity type included in the one or more determined entity types (e.g., a MOVIE entity type, a MOVIE_ACTOR entity type, etc.) at 160. For example, a video content server can determine which entities or attributes are shared among the multiple video content items, determine a subset of the shared entities or attributes (e.g., top ten, top thirty, etc.), and determine whether the subset of shared entities includes an entity having an entity type of the movie entity type. In a more particular example, as shown in FIG. 2, a video content server can determine whether one or more movie entity type, such as a FILM_MOVIE entity type and/or a MOVIE entity type, is present among the top M shared entities of the obtained search results at 250. In another example, a video content server can determine whether one of the entities shared between the search results has a particular entity type associated with the class of an authoritative result candidate.

It should be noted that, upon determining that an entity or attribute shared among the multiple video content items (or M number of common entities) does not have an entity type included in the one or more movie entity types (e.g., an entity type of the FILM_MOVIE entity type or of the FILM_DIRECTOR entity type), such a determination can indicate to the video content server that the search query may not intend to search for a movie.

Additionally or alternatively to reviewing common entities shared between the search results, metadata including entity types associated with each of the search results can be compared to product a set of entity types common to the search results and the content items corresponding to the search results. In some embodiments, a particular number of entity types within the set of entity types common to the search results can be selected (e.g., M number of common entity types). The video content server can then determine whether the one or more entity types corresponding to the content class (e.g., movies) are included in the subset of entity types common to the search results.

Referring back to FIG. 1, in some embodiments, yet another criterion can include determining whether the search results include one or more authoritative result candidates and whether one of the entities associated with each of the authoritative result candidates (e.g., a full length movie, an authoritative movie, etc.) has an entity type of the one or more determined entity types at 170. For example, as shown at 260 in FIG. 2, a video content server can determine whether the search results include one or more movie content items and whether each movie content item includes one or more movie entity types (e.g., an entity having the FILM_MOVIE entity type and/or the FILM_DIRECTOR entity type). In another example, a video content server can determine whether one or more movie content items include an entity having a particular entity type associated with the class of a movie content item (e.g., the one or more determined entity types from 130 of FIG. 1).

It should be noted that, upon determining that the one or more movie content items or any other suitable content item that is considered for promotion do not have an associated entity that has an entity type of the one or more movie entity types (or any other determined entity types), such a determination can indicate to the video content server that the one or more movie content items are not movies that users may conduct a search. As such, the one or more movie content items may not be considered for presentation and/or promotion in response to the particular search query.

Additionally or alternatively to accessing entities and entity types associated with one or more video content items, the video content server can access an entity histogram associated with multiple video content items. For example, in order to determine whether one or more video content items within the obtained search results include a particular entity type (e.g., a FILM_MOVIE entity type, a MOVIE entity type, etc.), the video content server can access a histogram distribution of entity types. In another example, in order to determine whether a particular entity type (e.g., a FILM_MOVIE entity type, a MOVIE entity type, etc.) is among the top shared entity types, the video content server can access a histogram distribution of entity types across the search results. In such an example, an entity histogram can be generated for the different entity types that are common, or uncommon, for the particular search query or the particular set of search results. The entity histogram can indicate, for example, whether the entity type FILM_MOVIE or the entity type MOVIE is common and/or popular among the entity and/or entity types associated with the video content items.

It should be noted that, although the embodiments described above generally relate to determining whether to promote one or more movie results within search results based on various criterion (e.g., whether a FILM_MOVIE entity type is present), this determination can be performed to determine whether to promote any other suitable class of content item (e.g., a class lecture, a live performance of an artist, etc.). For example, in some embodiments, the video content server can determine the class associated with the authoritative item that is being considered for promotion within the search results and can determine a particular entity type corresponding to the determined class (e.g., a FILM_MOVIE entity type for movie content items). In an example for class lectures, the criterion can include determining whether a content item in the search results is associated with the particular entity type associated with class lectures and/or determining whether the commonly shared entities between the content items in the search results includes the particular entity type associated with class lectures. In some embodiments, the video content server can provide a user, such as a content owner, with an opportunity to indicate which particular entity types to verity within search results prior to promoting a particular content item or a particular class of content items within the search results.

It should also be noted that, although the embodiments described above generally relate to determining whether to promote search results based on entity type, any suitable information, such as entity information, can also be used. For example, one criterion in the intent analysis can include determining whether the entities shared between multiple content items are included in a set of entities associated with content that the user is searching for. In this example, a set of entities (where each entity can be associated with multiple entity types) can be generated from the received query and, in turn, it can be determined whether at least a portion of the multiple entities associated with a particular search result are included in the set of entities generated from the received query.

At 180, in response to determining that the analysis has met one or more of the criterion (e.g., criterion 150, criterion 160, and/or criterion 170), the content server can promote the one or more authoritative result candidates that are each associated with a content item in the list of obtained search results (e.g., promote the result to the top of the list) and/or present the updated list of search results to the user at 190. For example, as shown in FIG. 2, the video content server can promote one or more movie search results that are each associated with a movie content item within the list of search results at 280 (e.g., an improved position in the listing). More particularly, as shown in FIG. 3, in response to determining that the received search query of "cars cars" in search interface 310 has the likely intent to obtain a movie result and that a movie content item 330 for the movie "Cars" is a suitable match for the received search query, the video content server can promote the movie result 330 corresponding to the movie content item within the list of search results 320.

Additionally or alternatively, in some embodiments, in response to determining that the analysis has met one or more criterion (e.g., criterion 150, criterion 160, and/or criterion 170), the content server can determine whether to perform an action on one or more search results (whether the search result is deemed an authoritative result candidate or a non-authoritative result candidate) based on their associated entity information and/or entity type information. For example, based on associated entity information (e.g., a number of shared entities) and associated entity type information (e.g., a number of shared entity types, a number of the same or similar entity types, etc.), the content server can determine that one or more search results are to be promoted, demoted, and/or inhibited from being presented or included within a list of search results. In another example, in response to determining that a search query intends to search for content items in a particular content class, one or more search results that belong to the particular content class or an associated content class can be promoted. Alternatively, in response to determining that particular search results do not belong to the particular content class or an associated content class, those particular search results can be demoted and/or inhibited from being presented or included in a list of search results.

It should be noted that, in some embodiments, multiple authoritative result candidates can be promoted concurrently. For example, upon determining that the search results include multiple authoritative result candidates, it can be determined whether each authoritative result candidate is associated with an entity having an entity type that corresponds to one or more determined entity types. In a more particular example, each authoritative result candidate can be associated with multiple entities, each of the entities can be associated with multiple entity types, and it can be determined if any of these multiple entity types associated with an authoritative result candidate is the same or similar to the one or more determined entity types (e.g., determined from the search query, determined from user input, specified by the user, etc.). In response to the multiple authoritative result candidates meeting this criterion, an entity score can be assigned to each of the authoritative result candidates based on other criterion relating to entities and/or entity types. For example, an entity score can indicate the number of entity types associated with a result that are in common with the one or more determined entity types. In another example, an entity score can indicate the percentage of similarity between the entity types associated with a result and the one or more determined entity types. In some embodiments, the entity score can be combined with other scores, such as relevancy scores provided by a search engine. In response, authoritative result candidates can be ranked by entity score and promoted accordingly. For example, when there are multiple authoritative result candidates, the authoritative result candidates can be ranked by entity score, where an authoritative result candidate having a high entity score can be positioned higher in a list of search results than an authoritative result candidate having a lower entity score. This can, for example, allow multiple authoritative result candidates to be promoted within the list, demoted within the list, and/or inhibited from being promoted or presented at or near the same time.

Similarly, multiple search results (whether deemed as an authoritative result or a non-authoritative result) can be promoted concurrently. For example, it can be determined whether each search result is associated with an entity having an entity type that corresponds to one or more determined entity types. In another example, it can be determined whether one or more search results that belong to a particular content class and it can also be determined for those search results whether a particular criterion has been met (e.g., whether at least one of the search results belonging to the content class is associated with the one or more determined entity types, whether entities shared between these search results have one or more entity types included in the one or more determined entity types). In response to satisfying one or more of these criterion, multiple search results can be promoted, demoted, and/or inhibited from being presented or included within a list of search results.

It should also be noted that, although the illustrative example shown in FIG. 3 promotes a particular movie content item to the top of the list of search results, this is merely illustrative. The particular content item can be promoted and/or presented in any suitable manner. For example, a particular content item can be promoted to a particular position within a list of search results. In another example, a particular content item can be presented in a designated area outside of the list of search results.

Alternatively, in response to determining that the analysis has not met a particular number of criteria (e.g., one of criterion 150, 160, and 170, two of criterion 150, 160, and 170, etc.), the content server can inhibit the promotion and/or presentation of one or more content item within the list of search results at 195. That is, unless the analysis determines that a particular number of criteria has been met (e.g., at least two of criterion 150, 160, and 170), the content server can inhibit the content item from triggering. For example, as shown in FIG. 2, in response to determining that the received search query does not have the intent of obtaining a movie result, the video content server can inhibit the promotion or presentation of one or more movie results that each correspond to a movie content item (e.g., movie result 330 of FIG. 3) in the list of search results at 290. In another example, in response to determining that the received search query does not have the intent of obtaining a movie result, the video content server can inhibit the one or more movie results that each correspond to a movie content item from being displayed within the list of search results.

It should be understood that the above steps of the flow diagram of FIGS. 1 and 2 can be executed or performed in any order or sequence not limited to the order and sequence shown and described in the figure. Also, some of the above steps of the flow diagrams of FIGS. 1 and 2 can be executed or performed substantially simultaneously where appropriate or in parallel to reduce latency and processing times.

It should be noted that, although the embodiments described herein generally relate to promoting or presenting (or inhibiting the promotion or presentation of) an authoritative result candidate, the content server can determine whether any suitable search result can be promoted or presented. For example, in response to determining multiple entities or entity types (e.g., derived from a search query, associated with a particular class of content, provided by a user of a content hosting service, etc.), the multiple entities or multiple entity types associated with each search result responsive to a search query can be compared with the determined multiple entities or entity types and a suitable entity score can be generated for each search result. Search results can then be promoted, demoted, and/or inhibited from being promoted or presented based on an entity score (e.g., the number of corresponding entity types, the number of shared entities, etc.).

It should also be noted that, although the embodiments described herein generally relate to ranking video content items resulting from a video search query, this is merely illustrative. In some embodiments, the ranking and/or prioritizing approaches described herein can be used to promote a particular class of content items on any suitable search engine. In other suitable embodiments, the ranking and/or prioritizing approaches described herein can be used to rank media (e.g., music, artists, videos, movies, television channels, etc.) on any suitable page.

Figure 4:
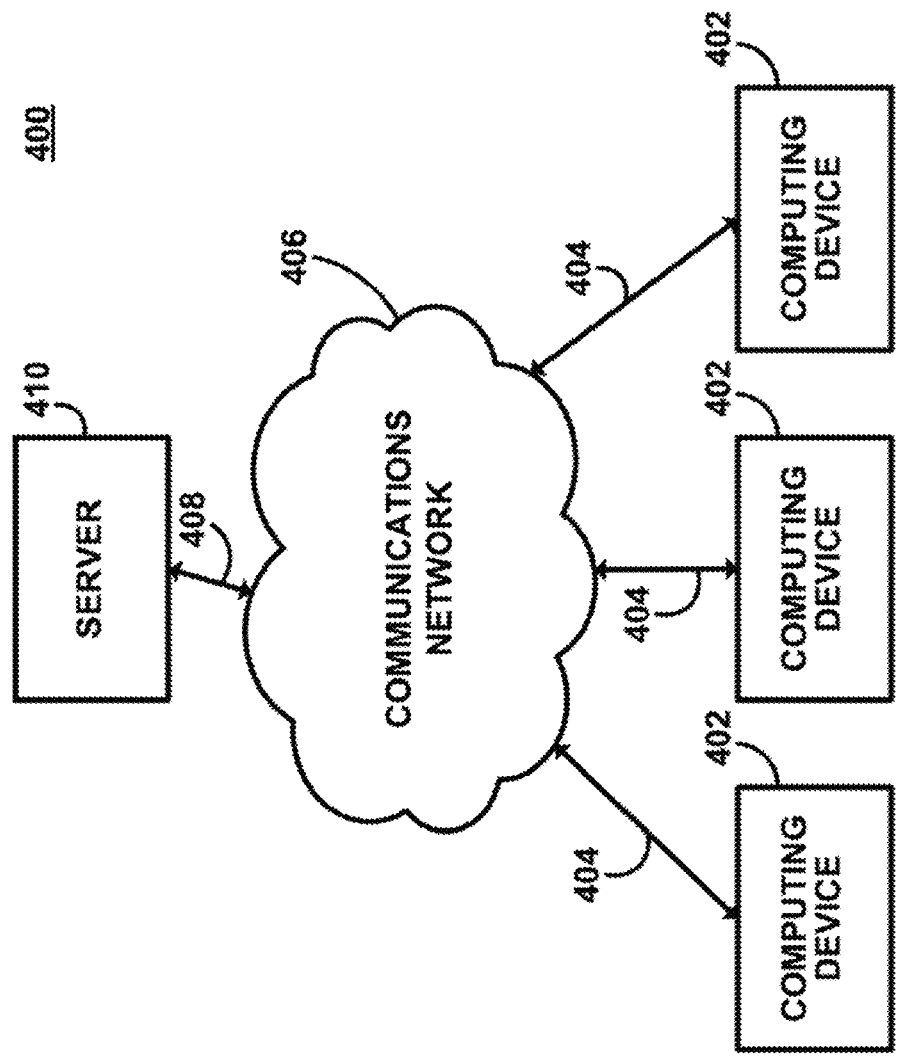
FIG. 4 is a diagram of an illustrative system on which the content ranking mechanisms can be implemented in accordance with some embodiments of the disclosed subject matter.

FIG. 4 is a generalized schematic diagram of a system 400 on which the content ranking mechanisms can be implemented in accordance with some embodiments of the disclosed subject matter. As illustrated, system 400 can include one or more computing devices 402, such as a user computing device for accessing and/or searching for content items (e.g., video content items), a user computing device for uploading and/or otherwise providing content items (e.g., video content items) for consumption by other users, etc. Computing devices 402 can be local to each other or remote from each other. Computing devices 402 are connected by one or more communications links 404 to a communications network 406 that is linked via a communications link 408 to a server 410.

System 400 can include one or more servers 410. Server 410 can be any suitable server for providing access to the content ranking and/or prioritizing mechanisms, such as a processor, a computer, a data processing device, or a combination of such devices. For example the content ranking and/or prioritizing mechanisms can be distributed into multiple backend components and multiple frontend components or interfaces. In a more particular example, backend components, such as data collection and data distribution can be performed on one or more servers 410. Similarly, the graphical user interfaces displayed by the content server, such as a search interface for accessing content items to users, can be distributed by one or more servers 410 to computing device 402. For example, server 410 can be operated by a video content service that stores video content items (and, in some cases, movie content items or authoritative content items) in one or more video databases, where the video content service using server 410 displays graphical user interfaces to users for searching and/or accessing video content items.

More particularly, for example, each of the computing devices 402 and server 410 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, computing device 402 can be implemented as a personal computer, a tablet computing device, a personal data assistant (PDA), a portable email device, a multimedia terminal, a mobile telephone, a gaming device, a set-top box, a television, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 4, communications network 406 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 404 and 408 may be any communications links suitable for communicating data between computing devices 402 and server 410, such as network links, dial-up links, wireless links, hard-wired links, any other suitable communications links, or a combination of such links. Computing devices 402 enable a user to access features of the application. Computing devices 402 and server 410 may be located at any suitable location. In one embodiment, computing devices 402 and server 410 may be located within an organization. Alternatively, computing devices 402 and server 410 may be distributed between multiple organizations.

Figure 5:
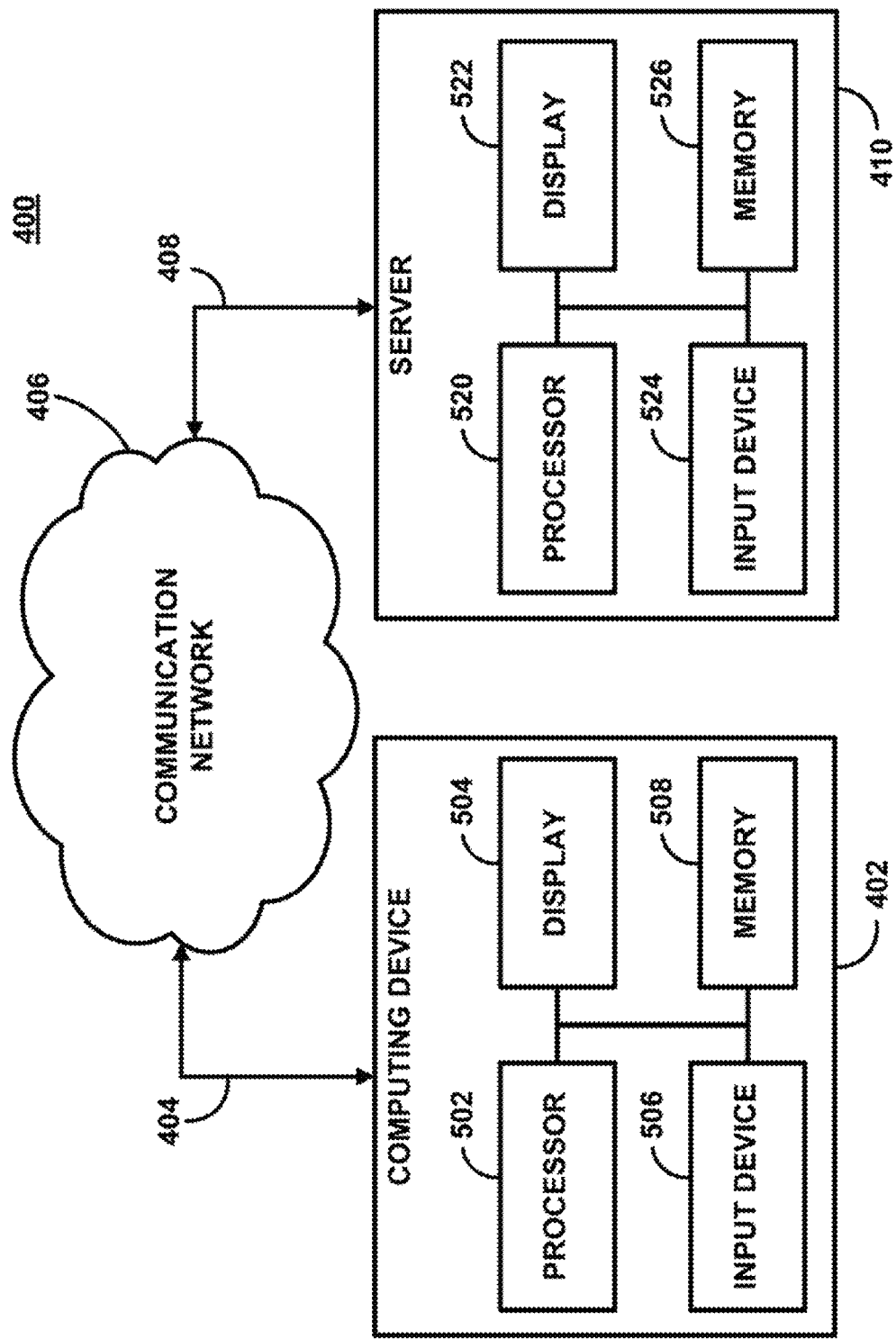
FIG. 5 is a diagram of an illustrative computing device and server as provided, for example, in FIG. 4 in accordance with some embodiments of the disclosed subject matter.

Referring back to FIG. 4, the server and one of the computing devices depicted in FIG. 4 are illustrated in more detail in FIG. 5. Referring to FIG. 5, computing device 402 may include processor 502, display 504, input device 506, and memory 508, which may be interconnected. In a preferred embodiment, memory 508 contains a storage device for storing a computer program for controlling processor 502.

Processor 502 uses the computer program to present on display 504 the application and the data received through communications link 404 and commands and values transmitted by a user of computing device 402. It should also be noted that data received through communications link 404 or any other communications links may be received from any suitable source. Input device 506 may be a computer keyboard, a mouse, a cursor-controller, dial, switchbank, lever, or any other suitable input device as would be used by a designer of input systems or process control systems. Alternatively, input device 506 may be a finger or stylus used on a touch screen display 504.

Server 410 may include processor 520, display 522, input device 524, and memory 526, which may be interconnected. In a preferred embodiment, memory 526 contains a storage device for storing data received through communications link 408 or through other links, and also receives commands and values transmitted by one or more users. The storage device further contains a server program for controlling processor 520.

In some embodiments, the application may include an application program interface (not shown), or alternatively, the application may be resident in the memory of computing device 402 or server 410. In another suitable embodiment, the only distribution to computing device 402 may be a graphical user interface ("GUI") which allows a user to interact with the application resident at, for example, server 410.

In one particular embodiment, the application may include client-side software, hardware, or both. For example, the application may encompass one or more Web-pages or Web-page portions (e.g., via any suitable encoding, such as Hyper-Text Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a user computer and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

Accordingly, methods, systems, and media for ranking content items using topics are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for ranking content, comprising:
   receiving, using a hardware processor, a search query;
   generating a plurality of search results in response to the search query;
   determining one or more entity types associated with a content class within the plurality of search results, wherein the content class indicates a type of media content of a content item associated with at least one search result of the plurality of search results, and wherein the one or more entity types indicate information associated with the type of media content;
   determining whether the search query is a query for content belonging to the content class based on a plurality of criteria that includes: (i) determining whether at least one of the plurality of search results is associated with the one or more determined entity types; (ii) determining whether entities shared between the plurality of search results are associated with content corresponding to the one or more determined entity types, wherein each entity includes metadata indicating at least a topic of a corresponding search result; and (iii) determining whether the plurality of search results includes one or more authoritative result candidates having an entity with an entity type corresponding to the one or more entity types; and
   in response to determining that the plurality of criteria have been met, promoting at least one search result of the plurality of search results belonging to the content class.

2. The method of claim 1, wherein the plurality of search results correspond to at least one of: a video content item, an audio content item, a movie content item, a channel, a playlist, a television show, a topic, a document, a live performance, and a class lecture.

3. The method of claim 1, wherein at least one search result from the plurality of search results is associated with a plurality of entities, and wherein each of the plurality of entities is associated with one of a plurality of entity types.

4. The method of claim 1, further comprising determining whether at least one of the plurality of search results is associated with the one or more entity types by accessing a histogram of entities associated with the plurality of search results.

5. The method of claim 1, wherein the entities shared between the plurality of search results are determined to include the one or more entity types by:
   comparing entity types corresponding to the entities associated with each of the plurality of search results to produce a set of entity types common to the plurality of search results; and
   determining whether the one or more entity types are included in the set of entity types common to the plurality of search results.

6. The method of claim 1, further comprising promoting the one or more authoritative result candidates belonging to the content class within a list of at least a portion of the plurality of search results in response to determining that the plurality of criteria have been met.

7. The method of claim 1, further comprising, in response to determining that the plurality of criteria have not been met, performing at least one of:
   inhibiting the one or more authoritative result candidates from being included in the list of the plurality of search results;
   inhibiting the one or more authoritative result candidates from being promoted within the list of the plurality of search results; and
   demoting the one or more authoritative result candidates within a list of at least a portion of the plurality of search results.

8. The method of claim 1, further comprising, in response to determining that the plurality of criteria have not been met, performing at least one of:

inhibiting the at least one search result of the plurality of search results belonging to the content class from being included in the list of the plurality of search results;

inhibiting the at least one search result of the plurality of search results belonging to the content class from being promoted within the list of the plurality of search results; and demoting the at least one search result of the plurality of search results within a list of at least a portion of the plurality of search results.

9. A system for ranking content, comprising:

a hardware processor that:

receives a search query;

generates a plurality of search results in response to the search query;

determines one or more entity types associated with a content class within the plurality of search results, wherein the content class indicates a type of media content of a content item associated with at least one search result of the plurality of search results, and wherein the one or more entity types indicate information associated with the type of media content;

determines whether the search query is a query for content belonging to the content class based on a plurality of criteria that includes: (i) determining whether at least one of the plurality of search results is associated with the one or more determined entity types; (ii) determining whether entities shared between the plurality of search results are associated with content corresponding to the one or more determined entity types, wherein each entity includes metadata indicating at least a topic of a corresponding search result; and (iii) determining whether the plurality of search results includes one or more authoritative result candidates having an entity with an entity type corresponding to the one or more entity types; and in response to determining that the plurality of criteria have been met, promotes at least one search result of the plurality of search results belonging to the content class.

10. The system of claim 9, wherein the plurality of search results correspond to at least one of: a video content item, an audio content item, a movie content item, a channel, a playlist, a television show, a topic, a document, a live performance, and a class lecture.

11. The system of claim 9, wherein at least one search result from the plurality of search results is associated with a plurality of entities, and wherein each of the plurality of entities is associated with one of a plurality of entity types.

12. The system of claim 9, further comprising determining whether at least one of the plurality of search results is associated with the one or more entity types by accessing a histogram of entities associated with the plurality of search results.

13. The system of claim 9, wherein the entities shared between the plurality of search results are determined to include the one or more entity types by:

comparing entity types corresponding to the entities associated with each of the plurality of search results to produce a set of entity types common to the plurality of search results; and determining whether the one or more entity types are included in the set of entity types common to the plurality of search results.

14. The system of claim 9, further comprising promoting the one or more authoritative result candidates belonging to the content class within a list of at least a portion of the plurality of search results in response to determining that the plurality of criteria have been met.

15. The system of claim 9, further comprising, in response to determining that the plurality of criteria have not been met, performing at least one of:

inhibiting the one or more authoritative result candidates from being included in the list of the plurality of search results;

inhibiting the one or more authoritative result candidates from being promoted within the list of the plurality of search results; and demoting the one or more authoritative result candidates within a list of at least a portion of the plurality of search results.

16. The system of claim 9, further comprising, in response to determining that the plurality of criteria have not been met, performing at least one of:

inhibiting the at least one search result of the plurality of search results belonging to the content class from being included in the list of the plurality of search results;

inhibiting the at least one search result of the plurality of search results belonging to the content class from being promoted within the list of the plurality of search results; and demoting the at least one search result of the plurality of search results within a list of at least a portion of the plurality of search results.

17. A non-transitory computer-readable medium containing computer-executable instructions that, when executed by a processor, cause the processor to perform a method for ranking content, the method comprising:

receiving a search query;

generating a plurality of search results in response to the search query;

determining one or more entity types associated with a content class within the plurality of search results, wherein the content class indicates a type of media content of a content item associated with at least one search result of the plurality of search results, and wherein the one or more entity types indicate information associated with the type of media content;

determining whether the search query is a query for content belonging to the content class based on a plurality of criteria that includes: (i) determining whether at least one of the plurality of search results is associated with the one or more determined entity types; (ii) determining whether entities shared between the plurality of search results are associated with content corresponding to the one or more determined entity types, wherein each entity includes metadata indicating at least a topic of a corresponding search result; and (iii) determining whether the plurality of search results includes one or more authoritative result candidates having an entity with an entity type corresponding to the one or more entity types; and in response to determining that the plurality of criteria have been met, promoting at least one search result of the plurality of search results belonging to the content class.

18. The non-transitory computer-readable medium of claim 17, wherein the plurality of search results correspond to at least one of: a video content item, an audio content item, a movie content item, a channel, a playlist, a television show, a topic, a document, a live performance, and a class lecture.

19. The non-transitory computer-readable medium of claim 17, wherein at least one search result from the plurality of search results is associated with a plurality of entities, and wherein each of the plurality of entities is associated with one of a plurality of entity types.

20. The non-transitory computer-readable medium of claim 17, wherein the method further comprises determining whether at least one of the plurality of search results is associated with the one or more entity types by accessing a histogram of entities associated with the plurality of search results.

21. The non-transitory computer-readable medium of claim 17, wherein the entities shared between the plurality of search results are determined to include the one or more entity types by:
    comparing entity types corresponding to the entities associated with each of the plurality of search results to produce a set of entity types common to the plurality of search results; and
    determining whether the one or more entity types are included in the set of entity types common to the plurality of search results.

22. The non-transitory computer-readable medium of claim 17 wherein the method further comprises promoting the one or more authoritative result candidates belonging to the content class within a list of at least a portion of the plurality of search results in response to determining that the plurality of criteria have been met.

23. The non-transitory computer-readable medium of claim 17, wherein the method further comprises, in response to determining that the plurality of criteria have not been met, performing at least one of:
    inhibiting the one or more authoritative result candidates from being included in the list of the plurality of search results;
    inhibiting the one or more authoritative result candidates from being promoted within the list of the plurality of search results; and
    demoting the one or more authoritative result candidates within a list of at least a portion of the plurality of search results.

24. The non-transitory computer-readable medium of claim 17, wherein the method further comprises, in response to determining that the plurality of criteria have not been met, performing at least one of:
    inhibiting the at least one search result of the plurality of search results belonging to the content class from being included in the list of the plurality of search results;
    inhibiting the at least one search result of the plurality of search results belonging to the content class from being promoted within the list of the plurality of search results; and
    demoting the at least one search result of the plurality of search results within a list of at least a portion of the plurality of search results.

25. A method for ranking content, comprising:
    receiving, using a hardware processor, a search query;
    generating a plurality of search results in response to the search query;
    determining one or more entity types associated with a content class within the plurality of search results, wherein the content class indicates a type of media content of a content item associated with at least one search result of the plurality of search results, and wherein the one or more entity types indicate information associated with the type of media content;
    determining whether the search query is a query for content belonging to the content class by determining whether at least one of the plurality of search results is associated with the one or more determined entity types and determining whether the plurality of search results includes one or more authoritative result candidates having an entity with an entity type corresponding to the one or more entity types; and
    in response to determining that at least one of the plurality of search results is associated with the one or more determined entity types and that the plurality of search results includes the one or more authoritative result candidates having the entity with the entity type corresponding to the one or more entity types, promoting the at least one search result of the plurality of search results belonging to the content class.

26. A method for ranking content, comprising:
    receiving, using a hardware processor, a search query;
    generating a plurality of search results in response to the search query;
    determining one or more entity types associated with a content class within the plurality of search results, wherein the content class indicates a type of media content of a content item associated with at least one search result of the plurality of search results, and wherein the one or more entity types indicate information associated with the type of media content;
    determining whether the search query is a query for content belonging to the content class by determining whether entities shared between the plurality of search results are associated with content corresponding to the one or more determined entity types and determining whether the plurality of search results includes one or more authoritative result candidates having an entity with an entity type corresponding to the one or more entity toes, wherein each entity includes metadata indicating at least a topic of a corresponding search result; and
    in response to determining that the entities shared between the plurality of search results include the one or more determined entity types and that the plurality of search results includes the one or more authoritative result candidates having the entity with the entity type corresponding to the one or more entity types, promoting at least one search result of the plurality of search results belonging to the content class.

* * * * *